United States Patent
Bratthall

(10) Patent No.: US 6,446,975 B1
(45) Date of Patent: Sep. 10, 2002

(54) SEAL ARRANGEMENT

(75) Inventor: Johan Bratthall, Saltsjo-Boo (SE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/246,321

(22) Filed: Feb. 9, 1999

(30) Foreign Application Priority Data

May 18, 1998 (SE) .............................................. 9801731

(51) Int. Cl.⁷ ................................................. F16J 15/34
(52) U.S. Cl. ...................... 277/366; 277/361; 277/368; 277/408
(58) Field of Search ................. 277/361, 366, 277/368, 408, 370, 371, 375

(56) References Cited

U.S. PATENT DOCUMENTS

| | | | | |
|---|---|---|---|---|
| 3,489,419 A | * | 1/1970 | Stratienko | 277/361 |
| 3,591,188 A | * | 7/1971 | Eisner | 277/361 |
| 4,114,899 A | * | 9/1978 | Kulzer et al. | 277/361 |
| 4,361,334 A | * | 11/1982 | Amorese et al. | 277/408 |

FOREIGN PATENT DOCUMENTS

| | | | |
|---|---|---|---|
| SE | 200 144 | * | 9/1965 |
| SE | 7401606-4 | * | 12/1975 |
| SE | 9002791-3 | * | 4/1992 |

* cited by examiner

Primary Examiner—Lynne H. Browne
Assistant Examiner—Enoch Peavey
(74) Attorney, Agent, or Firm—Menotti J. Lambardi

(57) ABSTRACT

The invention concerns a seal device for a submersible machine, such as a pump or a mixer. The seal device is designed as an easily replaceable unit comprising two mechanical face seals (4,6) and (5,7) resp. with an intermediate room for a barrier liquid in which a pump for circulation of said liquid is arranged. A spring housing (10) which serves as a uniting means for the seal device is provided with connecting means for the rotary seal rings (4) and (5) resp. and acts as a hub for impeller vanes (16) in said circulation pump.

5 Claims, 2 Drawing Sheets

SEAL ARRANGEMENT

FIELD OF THE INVENTION

Background of the Invention

The present invention concerns a device for a submersible machine, such as a pump, a turbine or a mixer.

A machine of this type normally includes an electrically driven motor and a hydraulic unit with an impeller connected to the motor via a rotary driving shaft. In order to prevent the medium within the hydraulic unit from flowing along the shaft and penetrate the electric motor and cause damage, one or several seals are arranged between the motor and the hydraulic unit. A common type of seal is the so-called mechanical face seal, which comprises one seal ring rotating with the shaft and one stationary seal ring mounted in the surrounding housing. The two rings are pressed together by spring force thus preventing medium from penetrating between them.

If the medium within the hydraulic unit contains pollutants, a special problem occurs. As the pressure within the hydraulic unit is higher, pollutants may penetrate between the seal surfaces cause damage, meaning that the seal resultantly deteriorates or fails totally.

In order to solve this problem it is common to arrange two mechanical seals with an intermediate room filled with a barrier liquid such as oil, which lubricates and cools the surfaces. By this the seal adjacent the electric motor will always operate with a clean medium and thus the risks for damages will decrease drastically. If the seal adjacent the hydraulic unit should be damaged, medium from said unit may enter the barrier liquid room, but by controlling said liquid at regular intervals, the seal could be repaired or replaced before any serious damage has accured. An example on such a design is shown in the Swedish patent No 381 318.

If it has been noted that the barrier liquid has been too diluted by the medium in the hydraulic unit, the seal adjacent said unit must be replaced. If the dilution has been considerable, there is a risk that also the other seal has been damaged and therefore it might be preferable to replace both seals at the same time.

In order to make such a replacement easier, it has been suggested to arrange them in one single unit which makes service easier and increases the reliability. Examples on such designs are shown in the Swedish patents 200 144 and 466 925.

In order to obtain a good circulation of the barrier liquid within the seal unit, it has been suggested to arrange a pump within the latter. Especially in a case where it has been chosen to use a closed cooling system for the electric motor using the barrier liguid as a coolant, a pump is necessary if a sufficient flow should be obtained.

Known designs such as those shown in the Swedish patent 327 904 have however certain disadvantages concerning space demand and efficiency. This invention concerns a device which in an effective and secure: way obtains the necessary circulation even at a low rotation speed and which has a very limited space demand.

SUMMARY OF INVENTION

A seal device in the form of an easily exchangeable unit for a rotary driving shaft between an electric motor and a hydraulic unit, the seal device comprises first and second mechanical face seals having an intermediate room for a barrier liquid. The first mechanical face seal includes a first stationary seal ring and a first rotary seal ring and the second mechanical face seal includes a second stationary seal ring and a second rotary seal ring. A pump is provided for circulating the barrier liquid in the intermediate room. A cylindric spring housing that rotates with the shaft is connected to the first rotary seal ring with a first driver. The spring housing includes a second driver for driving the second rotary seal ring. The spring housing operates as a seat for a biasing element that urges the second rotary seal ring towards the second stationary seal ring and further operates as a hub for vanes in the pump. The outer pump housing wall of the pump is formed by first and second holders which are respectively for the first and second stationary seal rings.

BRIEF DESCRIPTION OF THE DRAWING

The invention is disclosed more closely below with reference to the enclosed drawings. FIG. 1 shows a cut through a pump unit provided with a seal arrangement according to the invention, while

DETAILED DESCRIPTION OF THE INVENTION

Figure 1:
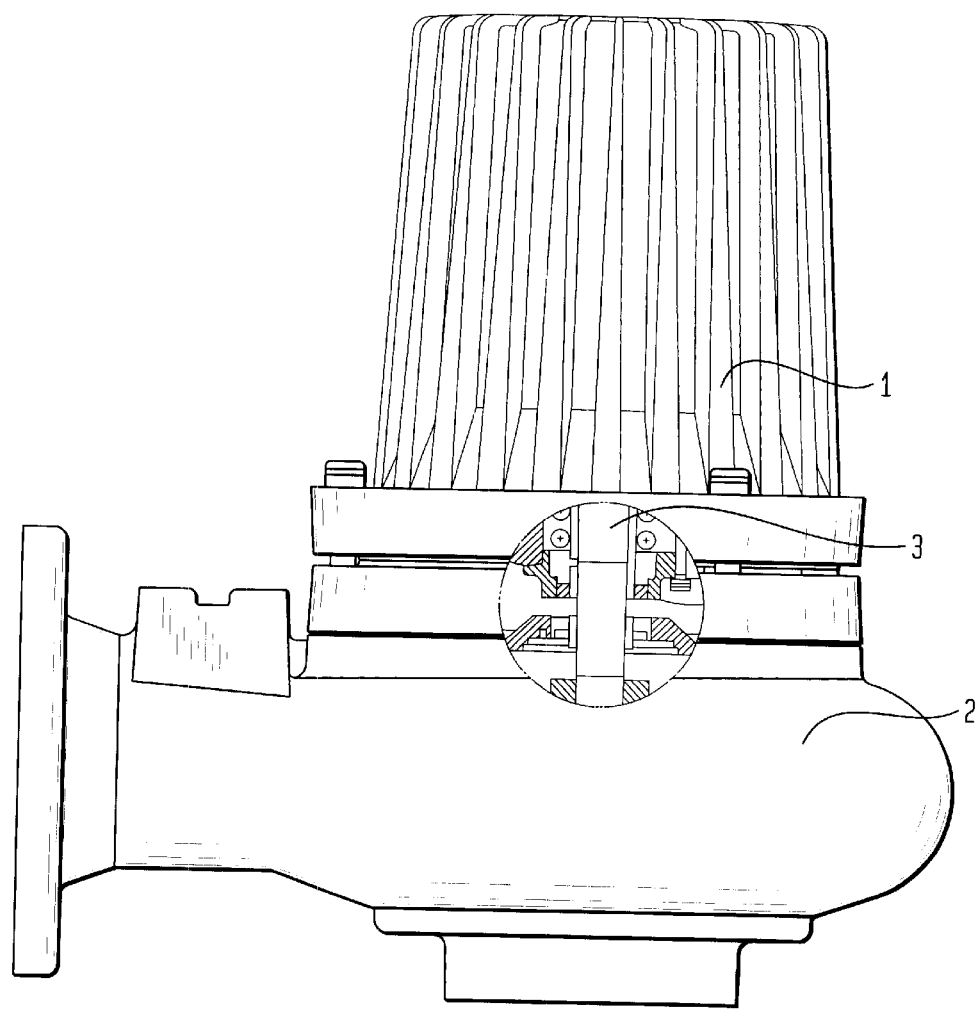
Figure 2:
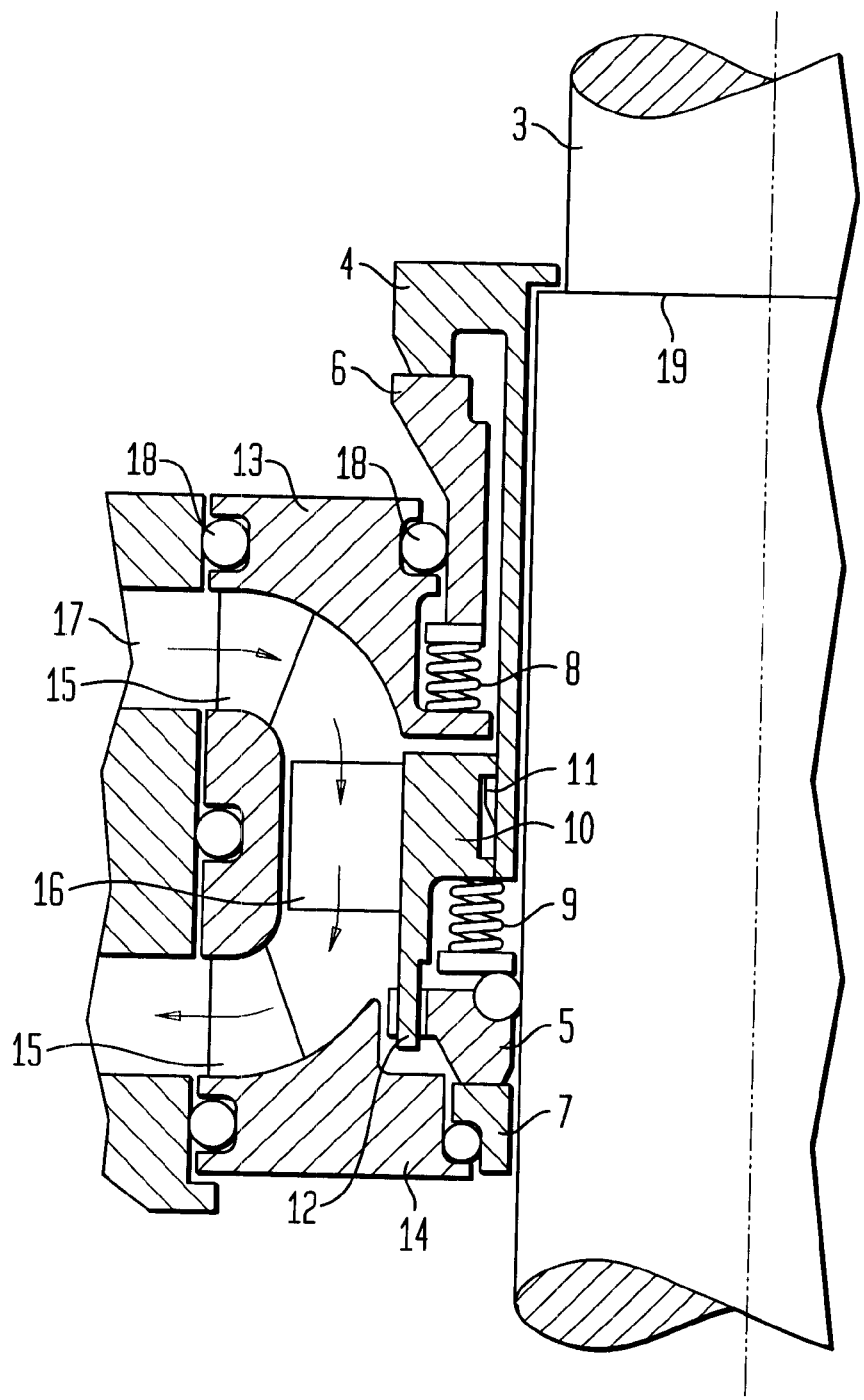
FIG. 2 is a principle sketch of the seal device with an integrated pump.

In the drawings 1 stands for a motor unit, 2 a hydraulic unit and 3 a driving shaft between the two. 4 and 5 stand for rotary seal rings, 6 and 7 stationary seal rings. 8 and 9 stand for springs, 10 a spring housing, 11 and 12 drivers, 13 and 14 holders for the stationary seal rings 6 and 7. 15 stands for stationary vanes, 16 an impeller vane, 17 a channel for medium, 18 o-rings and 19 a shoulder on the shaft 3.

The driving shaft 3 between the motor 1 and the hydraulic unit 2 is thus sealed-off by two mechanical face seals, 4,6 and 5, 7 respectively. The first, called the outer seal, is located close to the hydraulic unit, while the second, called the inner seal, is located close to the motor.

The seal rings 4 and 5 rotate with the shaft and are presed towards the stationary seal rings 6 and 7 respectively by spring force. In this way the medium within the hydraulic unit is effectively prevented from passing the seal area and penetrate the motor.

As previously mentioned, the seal device is designed as an easily replaceable unit. Said unit is slid onto the shaft 3 until it reaches a position decided by a shoulder 19 on the shaft, which shoulder supports the rotary seal ring 4 of the outer seal. Said replaceable unit includes the seals 4, 6 and 5, 7, a uniting spring housing 10 and holders 13 and 14 for the stationary seal rings 6 and 7.

The spring housing 10 is attached to the rotary seal ring 4 of the outer seal by help of snap-in means 11. As the seal ring 4 is in alignment with the shoulder 19 on the shaft 3, the spring housing will also be locked on the shaft and is prevented from moving in the direction of the motor 1. Said spring housing is also provided with a driver 12 for the rotary seal ring 5 of the inner seal and provides a seat for the spring means 9 which urges said ring towards the stationary ring 7 of said inner seal. Thanks to this design of the spring housing, a compact unit is obtained which has a minimum axial extension.

As previously mentioned, the seal unit also includes means for providing a circulation of the barrier medium, which medium also may be used as a coolant for the motor. In order to obtain this circulation, the spring housing 10 constitutes a hub for a number of impeller vanes 16 which rotate in an axial pump housing created by the holders 13 and 14 for the stationary seal rings 6 and 7 resp. Said holders being connected by means 15 which simultanously act as stationary vanes in said pump housing.

According to the invention, a seal device designed as a compact unit is obtained, which is easy to exchange in the machine where it is operating and which is easy to mount to a well-defined position on the driving shaft thanks to the shoulder mentioned. The unit includes a pump for circulation of the barrier medium within the seal, which medium also may serve as a coolant for the motor.

What is claimed is:

1. A seal device in the form of an easily exchangeable unit for a rotary driving shaft between an electric motor and a hydraulic unit, the seal device comprising:

first and second mechanical face seals having an intermediate room for a barrier liquid, the first mechanical face seal including a first stationary seal ring and a first rotary seal ring, the second mechanical face seal including a second stationary seal ring and a second rotary seal ring;

a pump for circulating the barrier liquid, the pump having an outer pump housing wall;

a cylindric spring housing that rotates with the shaft when the seal device is associated therewith, the spring housing connected to the first rotary seal ring with a first driver, the spring housing including a second driver for driving the second rotary seal ring, the spring housing operating as a seat for a biasing element that urges the second rotary seal ring towards the second stationary seal ring, the spring housing further operating as a hub for vanes in the pump for circulation of the barrier liquid, the outer pump housing wall of the pump formed by first and second holders which are respectively for the first and second stationary seal rings.

2. The seal device according to claim 1, where the hydraulic unit comprises submersible pump.

3. The seal device according to claim 2, wherein the submersible pump includes one of an impeller and a propeller.

4. The seal device according to claim 1, wherein the hydraulic unit comprises a mixer.

5. The seal device according to claim 4, wherein the submersible pump includes one of an impeller and a propeller.

* * * * *